(12) United States Patent
Nissilä

(10) Patent No.: US 7,035,736 B2
(45) Date of Patent: Apr. 25, 2006

(54) PORTABLE PERSONAL DATA PROCESSING DEVICE

(75) Inventor: Seppo Nissilä, Oulu (FI)

(73) Assignee: Polar Electro Oy, Kempele (FI)

( * ) Notice: Subject to any disclaimer, the term of this patent is extended or adjusted under 35 U.S.C. 154(b) by 0 days.

(21) Appl. No.: 10/818,696

(22) Filed: Apr. 6, 2004

(65) Prior Publication Data

US 2004/0220738 A1 Nov. 4, 2004

(30) Foreign Application Priority Data

Apr. 17, 2003 (FI) .................... 20030597

(51) Int. Cl.
*G01W 1/00* (2006.01)
*G06F 19/00* (2006.01)
(52) U.S. Cl. ....................................... 702/3
(58) Field of Classification Search .......... 702/3, 702/127, 130, 132; 73/170, 170.17, 170.21; 700/299, 300
See application file for complete search history.

(56) References Cited

U.S. PATENT DOCUMENTS

| | | | |
|---|---|---|---|
| 4,625,733 A | 12/1986 | Säynäjäkangas | |
| 6,049,069 A * | 4/2000 | Hochstein | 219/497 |
| 6,422,062 B1 * | 7/2002 | King et al. | 73/29.01 |
| 6,508,408 B1 * | 1/2003 | Kelly et al. | 236/91 C |
| 6,627,851 B1 * | 9/2003 | Sangwan et al. | 219/203 |

FOREIGN PATENT DOCUMENTS

| | | |
|---|---|---|
| DE | 10021797 A1 | 10/2001 |
| EP | 0441613 A2 | 8/1991 |
| EP | 0513420 A1 | 11/1992 |
| GB | 2190203 A | 11/1987 |
| GB | 2261536 A | 5/1993 |
| JP | 60-007380 | 1/1985 |

OTHER PUBLICATIONS

Evaluation Kit EK-H2 Humidity & Temperature, Version 2.1, Sensirion, Switzerland (2001).

* cited by examiner

*Primary Examiner*—John Barlow
*Assistant Examiner*—Demetrius Pretlow
(74) *Attorney, Agent, or Firm*—Hoffman & Baron, LLP

(57) ABSTRACT

The invention relates to a portable personal data processing device, such as a wrist-worn measuring device, a heart rate monitor, a subscriber terminal of a radio system, or a sports watch. The device includes a temperature sensor for measuring the ambient temperature and a humidity sensor for measuring the ambient humidity. Furthermore, dependence information, which defines temperature values of the dew points corresponding to the humidity values, is stored in the device. The control unit is configured to monitor the change rate of the measured temperature, to determine, on the basis of the change rate, the moment at which the temperature reaches the temperature value of the dew point corresponding to the measured humidity on the basis of the dependence information, and to provide a forecast on fog appearance in relation to the moment employing the user interface.

17 Claims, 1 Drawing Sheet

PORTABLE PERSONAL DATA PROCESSING DEVICE

CROSS-REFERENCE TO RELATED APPLICATION

This application claims priority based on Finnish Patent Application No. 20030597, filed on Apr. 17, 2003.

FIELD OF THE INVENTION

The invention relates to a portable personal data processing device. Such as device is, for example, a wrist-worn measuring device, a heart rate monitor, a subscriber terminal of a radio system, or a sports watch for use as an instrument in sports, hiking, sailing, mountain climbing and/or in snow sports.

BRIEF DESCRIPTION OF THE RELATED ART

Various wrist-worn measuring devices/sports watches are known in the art which may be provided with a barometer or a thermometer. In devices of this kind, the weather is predicted by monitoring the air pressure and by drawing conclusions from it.

SUMMARY OF THE INVENTION

The object of the invention is to provide an improved portable personal data processing device.

According to an aspect of the invention, there is provided a portable personal data processing device comprising a control unit for controlling the device, a user interface coupled to the control unit for giving commands to the device and obtaining feedback on its operation, and a temperature sensor coupled to the control unit for measuring the ambient temperature. The device further comprises a humidity sensor coupled to the control unit for measuring the ambient humidity, and dependence information, which defines temperature values for the dew points corresponding to the humidity values, is stored in the device, and the control unit is configured to monitor the change rate of the measured temperature, to determine, on the basis of the change rate, the moment when the measured temperature reaches the temperature value of the dew point corresponding to the measured humidity on the basis of the dependence information, and to provide a forecast on fog appearance in relation to the moment employing the user interface.

The device according to the invention provides several advantages. No portable personal data processing devices are known that could predict the appearance of fog. If the user receives information on the appearance of fog, he can be prepared for it. The information on fog may have an effect on route selection or travel plans, for example. In some applications, for example in mountain climbing or hiking, the device may help to avoid potential dangerous situations, such as falling or getting lost.

BRIEF DESCRIPTION OF THE DRAWINGS

The invention will now be described in greater detail by means of preferred embodiments with reference to the accompanying drawings, in which.

DETAILED DESCRIPTION OF THE PREFERRED EMBODIMENTS

Figure 1:
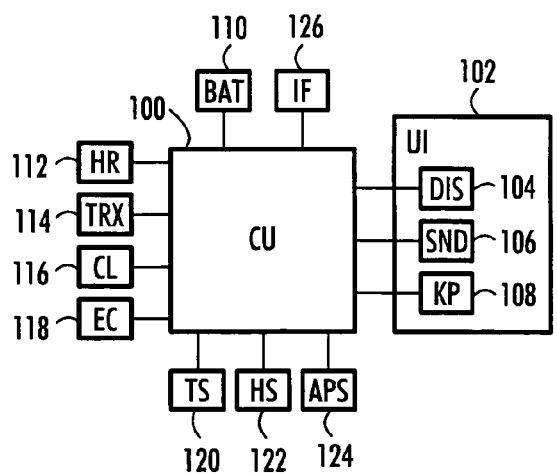
FIG. 1 is a simplified block diagram illustrating components of a portable personal data processing device.

Referring to FIG. 1, the structure of a portable personal data processing device will de described in an appropriately simplified manner. The device comprises a control unit 100 for controlling the device, and a user interface 102 coupled to the control unit 100 for giving commands to the device and obtaining feedback on its operation. The device comprises an independent power source 110, for example a non-chargeable battery or a chargeable battery. A solar cell, which generates energy from a light source and is either connected to the device or integrated into it, may also be utilized for obtaining power. Other prior art methods of generating power for a portable device may also be employed, such as a small-size generator, which produces power from movement and has been developed by watch producer Seiko®.

The control unit 100 is usually implemented as a processor with software, but various hardware implementations are also feasible, such as a circuit consisting of logic components or one or more application-specific integrated circuits ASIC. A hybrid of these implementations is also possible. In selecting the implementation, a person skilled in the art will pay attention to the requirements set for the size and power consumption of the device, the required processing capacity and the production costs and volumes.

The user interface 102 of the device typically comprises a display 104, a means 106 for producing sound and a keyboard 108. The display 104 may be a liquid crystal display, for example, but it can also be implemented by any appropriate prior art display technique. The means 106 for producing sound may be a loudspeaker or a simpler means for producing beeps or other sound signals. The keyboard 108 may even comprise a complete qwerty keyboard, a mere numeric keypad or only a few key buttons and/or rotary buttons. In addition, the user interface 102 may comprise other prior art user interface elements, for example various means for focusing a cursor (mouse, track ball, various arrow keys, etc.) or elements enabling audio control.

The device further comprises two different sensors coupled to the control unit 100: a temperature sensor 120 for measuring the ambient temperature and a humidity sensor 122 for measuring the ambient humidity. Such sensors are available from various producers. For example, Sensirion AG (whose web pages are found at the address www.sensirion.com) produces combined temperature and humidity sensors for this purpose which are implemented on one integrated CMOS circuit (complementary metal-oxide semiconductor circuit): the type of the surface mounting component is SHT1x and that of the component provided with a support SHT7x.

Dependence information, which defines the temperature values of dew points corresponding to the humidity values, is stored in the device. The above-mentioned combine temperature and humidity sensors 120, 122 by Sensirion already include the logic required to define the dew point. The dependence information can also be stored in the control unit 100 of the device. In addition, the information can be saved as tables or mathematical formulae, for instance.

In the following, a brief summary is given on the theoretical principles of determining a dew point. Air may contain only a certain maximum amount of water vapor, which is dependent on the air temperature. At a high temperature, air may contain more water vapor than at a low temperature. When air contains all the water it can retain, it is at a saturation point, i.e. its relative humidity is 100%. If the air temperature and humidity are measured, the dew point can be defined as the temperature to which the air temperature has to decrease so that air cannot retain all the water vapor. At the dew point, the humidity included in the air starts to condense into drops, i.e. a fog appears. An instrument called a psychometer is known to be used for determining the dew point. It comprises two standard thermometers in parallel: the bulb of one thermometer is in the air and the bulb of the other thermometer is in a wick wetted with water.

When the air temperature in Celsius degrees $T_c$ and the relative humidity in percentages RH are known, the dew point can be calculated by the following formulae, for example.

The pressure $E_s$ of saturated vapor is calculated by the formula:

$$E_s = 6.11 * 10.0^{\frac{7.5*T_c}{237.7+T_c}} \quad (1)$$

Next the real vapor pressure E of air is calculated by the formula $$E = \frac{RH * E_s}{100} \quad (2)$$

Then the dew point in Celsius degrees $T_{dc}$ can be calculated by the formula $$T_{dc} = \frac{-430.22 + 237.7 * \ln E}{-\ln E + 19.08}, \quad (3)$$

where InE means the natural logarithm of number E.

For example, if we assume that the air temperature is 16.5 C and the relative humidity 47%, then formula 1 gives 17.7 as the pressure of saturated vapor, formula 2 gives 8.3 as the real vapor pressure, and finally, formula 3 gives 4.3 C as the dew point. Consequently, if the air temperature drops from 15.6 Celsius degrees to 4.3 Celsius degrees, fog starts to form.

After this theoretical description, we can return to the structure of the device shown in FIG. 1. The control unit 100 is configured to monitor the rate of change of the measured temperature, to determine, on the basis of the rate of change, the moment when the measured temperature reaches the temperature value of the dew point corresponding to the measured humidity on the basis of the dependence information, and to provide a forecast on fog appearance in relation to the moment employing the user interface 102.

The device of FIG. 1 thus functions in such a manner that it measures the relative humidity of air by a humidity sensor 122 and the air temperature by a temperature sensor 120. After this, the device forms the dew point corresponding to the measured temperature and relative humidity. Then the device monitors the change rate of the air temperature employing the measurements carried out by the temperature sensor 120. Based on this change rate, the moment at which the air temperature reaches the dew point can be determined.

Then a forecast can be provided on fog appearance in relation to this moment employing the user interface 102 of the device. Let us assume that in the example described above, where the starting temperature of air was 16.5 C and the dew point 4.3 C, the change rate of air temperature is 5 Celsius degrees per hour. In that case, the dew point is reached in 2.26 hours, i.e. in approximately two hours and sixteen minutes.

Figure 4:
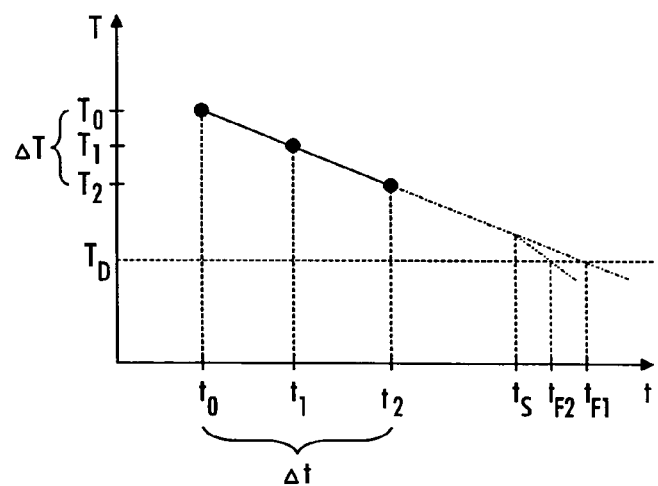
FIG. 4 illustrates prediction of fog appearance.

FIG. 4 illustrates the prediction of fog appearance: the horizontal axis describes the course of time and the vertical axis the decrease in temperature. The device measures the temperature $T_0$ at moment $t_0$. The dew point $T_D$ is determined on the basis of this. The device monitors the change in temperature by measuring $T_1$ as the temperature at moment $t_1$ and $T_2$ as the temperature at moment $t_2$. By calculating the temperature change $\Delta T$ within a certain time $\Delta t$, an estimate of how the temperature will drop can be formed. In FIG. 4, this first forecast is illustrated by a line where one point and one line alternate. The first forecast is linear as shown and the dew point $T_D$ is achieved at moment $T_{F1}$. According to the first forecast, fog will thus appear at moment $T_{F1}$.

In an embodiment, the control unit 100 is configured to show the amount of time left until the predicted fog appears in the user interface 102. This can be implemented for example by showing a decreasing counter on the display 104, the counter showing the time in hours and minutes within which fog will appear according to the forecast. The time when the fog will appear according to the forecast could also be shown on the display 104. In that case, the device could also include a clock 116, which would enable showing the actual time on the display 104. A separate clock circuit 116 is not necessarily needed, but when, for example, the control unit 100 is a processor with software, the clock can be implemented by forming the time by counting processor cycles by means of interruptions utilizing the software. If the device comprises a GPS receiver (Global Positioning System), the time information included in the GPS signal can be employed.

In an embodiment, the control unit 100 is configured to warn of approaching fog using a sound signal implemented by the user interface 102. The closer the predicted moment when fog will appear is, the more frequently the control unit 100 can be configured to give sound signals: first a beep can be produced every ten minutes, for example, after which the frequency can be increased stepwise or directly so that a beep is given every minute and finally every half a minute, for instance. If the means 106 for producing sound is a loudspeaker, even clear words (either recorded words or words produced by a speech synthesizer) can be employed for warning of approaching fog.

In an embodiment, the control unit 100 is configured to calculate the probability of fog appearance within a certain time based on a difference between the measured temperature and the temperature value of the dew point. In addition to the linear prediction described above, various heuristic rules, which will be described below, can be employed. The control unit 100 can be configured to present the probability of fog appearance as a percentage in the user interface 102. In an embodiment, the control unit 100 is configured to use one hour as the predetermined time. Thus, information according to which the probability of fog appearance within an hour is 90% can be shown on the display, for instance.

There may be various heuristic rules that may be applied separately or together in predicting fog, depending on the situation. In an embodiment, the control unit 100 is configured to take the time of the day into account in the monitoring of the temperature change rate. Temperature change rates in different seasons at certain places, e.g. at popular mountain climbing sites, can be stored in the control unit 100. In that case, the device should include calendar functions in addition to clock functions. According to a simple rule, the control unit 100 is configured to estimate that the direction of change in the temperature is descending and faster in the evening than in the day time: for example, in the afternoon the decrease rate of temperature may be 2 C/hour and in the evening 4 C/hour.

In an embodiment, the control unit 100 is configured to take the times of sunrise and sunset into account in monitoring the temperature change rate. The times of sunrise and sunset in certain areas may be stored in the control unit 100. If the device is provided with a GPS receiver, the control unit 100 may automatically retrieve the times of sunrise and sunset corresponding to the positioned location and the date retrieved from the calendar. In an embodiment, the control unit 100 is configured to estimate that the temperature change rate is the highest at the sunrise and sunset. FIG. 4 illustrates this second forecast improved on the basis of the sunset time by a line where two dots and one line alternate. The sun sets at moment $t_S$, after which the air temperature decreases linearly as in the first forecast but steeper. According to the second forecast, fog appears at moment $T_{F2}$.

In an embodiment, the device further comprises an air pressure sensor 124 coupled to the control unit 100 for measuring the ambient air pressure, and the control unit 100 is configured to take account of the measured air pressure when monitoring the temperature change rate. The measured air pressure can be utilized by configuring the control unit 100 to estimate the cloudiness of the weather on the basis of the measured air pressure, for instance. According to a very rough rule, low air pressure would mean cloudy weather and high air pressure sunny weather. In an embodiment, the control unit 100 is configured to estimate that the temperature change rate is lower in cloudy weather than in sunny weather. In an embodiment, the control unit 100 is configured to estimate that the temperature change rate is slower when the sun sets in cloudy weather than when the sun sets in sunny weather.

Figure 2:
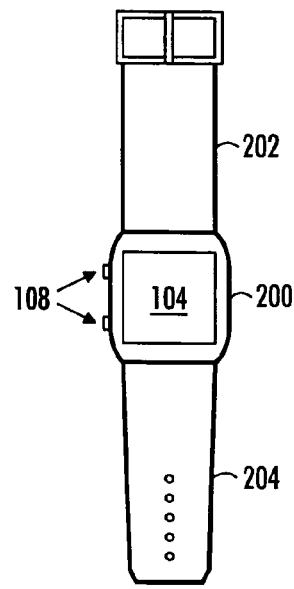
FIG. 2 illustrates a wrist-worn measuring device.

The device described in FIG. 1 may be, for example, a wrist-worn measuring device shown in FIG. 2. In the wrist-worn measuring device, the electronics components shown in FIG. 1, such as keys 108 and liquid crystal display 104 illustrated in FIG. 2, are protected by a cover 200 (which is usually waterproof). In addition, the wrist-worn measuring device comprises a wristband 202, 204 for attaching the device to the wrist. The portable personal device may also be a sports watch intended to be used as an instrument in sports, hiking, sailing, mountain climbing and/or in snow sports. The sports watch may comprise an electronic compass 118 as shown in FIG. 1. Sports watches are produced by Suunto®), for example (web pages at the address www.suunto.com).

The device may also be a heart rate monitor for measuring the user's heart rate, and possibly other parameters that can be measured non-invasively (such as blood pressure). In that case, the device comprises a heart rate measuring unit 112 shown in FIG. 1. In U.S. Pat. No. 4,625,733, Säynäjäkangas describes a wireless and continuous heart rate monitoring concept where a transmitter to be attached to the user's chest measures the user's ECG-accurate (electrocardiogram) heart rate and transmits the heart rate information telemetrically to the heart rate receiver attached to the user's wrist using magnetic coils in transmission. The heart rate monitor can also be implemented so that, instead of the solution consisting of a transmitter/receiver, the heart rate is measured directly from the wrist based on the pressure, for example. Other prior art methods for measuring the heart rate may also be employed, provided that they are suitable for use in a portable personal data processing device.

Polar Electro® (web pages at the address www.polar.fi) designs and manufactures heart rate monitors which comprise an electrode transmitter belt worn around the chest and an actual heart rate monitor worn on the wrist. The electronics unit in the electrode transmitter belt receives heart rate information from electrodes, which are used for measuring one or more parameters of the heart rate information. From the electrodes, the signal is transmitted to an ECG preamplifier, from which the signal is supplied to a transmitter via an AGC amplifier (Automatic Gain Control) and a power amplifier. The transmitter may be implemented as a coil, which transmits the heart rate information inductively to the receiver. For example, one burst of 5 kHz or a group of several bursts may correspond to one heartbeat. Information may be transmitted inductively or using another appropriate prior art data transmission method, for example over radio waves, optically or via a conduit. The receiver of the actual heart rate monitor can be implemented as a receiving coil, from which the received signal is transmitted via the signal receiver to the control unit 100, which controls and coordinates the function of the different components of the heart rate monitor. The heart rate monitor often comprises an interface 126 between the heart rate monitor and the outside world. Information stored in the heart rate monitor can be transmitted via the interface 126 to further processing, for example to a personal computer. The software of the heart rate monitor can also be updated via the interface 126. Furthermore, information required by some embodiments, e.g. information on the sunrise and sunset times, can be loaded into the heart rate monitor via the interface 126.

Figure 3:
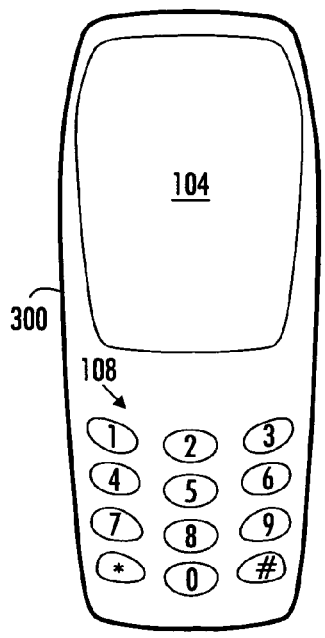
FIG. 3 illustrates a subscriber terminal of a radio system.

The device described in FIG. 1 may also be a subscriber terminal of a radio system illustrated in FIG. 3, for example a GSM (Global System for Mobile Communications) or a UMTS (Universal Mobile Telecommunications System) terminal. In that case, the electronics components/parts illustrated in FIG. 1 are arranged inside a protective cover 300. In addition, here the device comprises a radio transceiver 112 as shown in FIG. 1 for implementing a bidirectional circuit-switched or packet-switched radio connection to a base station of the system. Using this radio connection, information required by some embodiments, for example sunrise and sunset times, can be loaded into the subscriber terminal. If the control unit 100 of the device also includes a browser, the device user may retrieve required data from the web pages of the device producer using the radio connection, for instance.

Even though the invention was described above with reference to an example according to the accompanying drawings, it is clear that the invention is not limited to it but it may be modified in various ways within the attached claims.

What is claimed is:

1. A portable personal data processing device comprising:
    a control unit for controlling the device;
    a user interface coupled to the control unit for giving commands to the device and obtaining feedback on operation of the device;
    a temperature sensor coupled to the control unit for measuring ambient temperature;
    a humidity sensor coupled to the control unit for measuring ambient humidity; and dependence information, which defines temperature values of dew points corresponding to humidity values stored in the device, the control unit being configured to monitor the change rate of the measured temperature, to determine, on the basis of the change rate, the moment at which the temperature reaches a temperature value of a dew point corresponding to the measured humidity on the basis of the dependence information, and to provide a prediction of fog appearance in relation to the moment employing the user interface, the control unit being configured to show the time left until the predicted fog appearance in the user interface.

2. A device according to claim 1, wherein the control unit is configured to warn of approaching fog employing a sound signal implemented by the user interface.

3. A portable personal data processing device comprising:
a control unit for controlling the device;
a user interface coupled to the control unit for giving commands to the device and obtaining feedback on operation of the device;
a temperature sensor coupled to the control unit for measuring ambient temperature;
a humidity sensor coupled to the control unit for measuring ambient humidity; and
dependence information, which defines temperature values of dew points corresponding to humidity values stored in the device, the control unit being configured to monitor the change rate of the measured temperature, to determine, on the basis of the change rate, the moment at which the temperature reaches a temperature value of a dew point corresponding to the measured humidity on the basis of the dependence information, and to provide a prediction of fog appearance in relation to the moment employing the user interface, the control unit being configured to provide a sound signal by means of the user interface more frequently as the predicted moment when fog will appear becomes closer.

4. A portable personal data processing device comprising:
a control unit for controlling the device;
a user interface coupled to the control unit for giving commands to the device and obtaining feedback on operation of the device;
a temperature sensor coupled to the control unit for measuring ambient temperature;
a humidity sensor coupled to the control unit for measuring ambient humidity; and
dependence information, which defines temperature values of dew points corresponding to humidity values, is stored in the device, the control unit being configured to monitor the change rate of the measured temperature, to determine, on the basis of the change rate, the moment at which the temperature reaches a temperature value of a dew point corresponding to the measured humidity on the basis of the dependence information, and to provide a prediction of fog appearance in relation to the moment employing the user interface the control unit being configured to calculate a probability of fog appearance within a certain time on the basis of a difference between the measured temperature and the temperature value of the dew point.

5. A device according to claim 4, wherein the control unit is configured to show a probability of fog appearance as a percentage in the user interface.

6. A device according to claim 4, wherein the control unit is configured to use one hour as the predetermined time.

7. A portable personal data processing device comprising:
a control unit for controlling the device;
a user interface coupled to the control unit for giving commands to the device and obtaining feedback on operation of the device;
a temperature sensor coupled to the control unit for measuring ambient temperature;
a humidity sensor coupled to the control unit for measuring ambient humidity; and
dependence information, which defines temperature values of dew points corresponding to humidity values stored in the device, the control unit being configured to monitor the change rate of the measured temperature, to determine, on the basis of the change rate, the moment at which the temperature reaches a temperature value of a dew point corresponding to the measured humidity on the basis of the dependence information, and to provide a prediction of fog appearance in relation to the moment employing the user interface, the control unit being configured to take the time of the day into account in monitoring the temperature change rate.

8. A device according to claim 7, wherein the control unit is configured to estimate that the direction of temperature change is descending and faster in the evening than in the day time.

9. A portable personal data processing device comprising:
a control unit for controlling the device;
a user interface coupled to the control unit for giving commands to the device and obtaining feedback on operation of the device;
a temperature sensor coupled to the control unit for measuring ambient temperature;
a humidity sensor coupled to the control unit for measuring ambient humidity; and
dependence information, which defines temperature values of dew points corresponding to humidity values stored in the device, the control unit being configured to monitor the change rate of the measured temperature, to determine, on the basis of the change rate, the moment at which the temperature reaches a temperature value of a dew point corresponding to the measured humidity on the basis of the dependence information, and to provide a prediction of fog appearance in relation to the moment employing the user interface, the control unit being configured to take the sunrise and sunset times into account in monitoring the temperature change rate.

10. A device according to claim 9, wherein the control unit is configured to estimate that the temperature change rate is higher at the sunrise and sunset.

11. A portable personal data processing device comprising:
a control unit for controlling the device;
a user interface coupled to the control unit for giving commands to the device and obtaining feedback on operation of the device;
a temperature sensor coupled to the control unit for measuring ambient temperature;
a humidity sensor coupled to the control unit for measuring ambient humidity;
dependence information, which defines temperature values of dew points corresponding to humidity values stored in the device, the control unit being configured to monitor the change rate of the measured temperature, to determine, on the basis of the change rate, the moment at which the temperature reaches a tempera ture value of a dew point corresponding to the measured humidity on the basis of the dependence information, and to provide a forecast on prediction of fog appearance in relation to the moment employing the user interface, the control unit being configured to estimate the cloudiness of the weather on the basis of the measured air pressure, an air pressure sensor coupled to the control unit for measuring the ambient air pressure, the control unit being configured to take the measured air pressure into account in monitoring the temperature change rate.

12. A device according to claim 11, wherein the control unit is configured to estimate that the temperature change rate is lower in cloudy weather than in sunny weather.

13. A device according to claim 11, wherein the control unit is configured to estimate that the temperature change rate is lower when the sun sets in cloudy weather than when the sun sets in sunny weather.

14. A portable personal data processing device comprising:

a control unit for controlling the device;
a user interface coupled to the control unit for giving commands to the device and obtaining feedback on operation of the device;
a temperature sensor coupled to the control unit for measuring ambient temperature;
a humidity sensor coupled to the control unit for measuring ambient humidity; and
dependence information, which defines temperature values of dew points corresponding to humidity values stored in the device, the control unit being configured to monitor the change rate of the measured temperature, to determine, on the basis of the change rate, the moment at which the temperature reaches a temperature value of a dew point corresponding to the measured humidity on the basis of the dependence information, and to provide a prediction of fog appearance in relation to the moment employing the user interface, the portable personal device being a wrist-worn measuring device.

15. A portable personal data processing device comprising:

a control unit for controlling the device;
a user interface coupled to the control unit for giving commands to the device and obtaining feedback on operation of the device;
a temperature sensor coupled to the control unit for measuring ambient temperature;
a humidity sensor coupled to the control unit for measuring ambient humidity; and
dependence information, which defines temperature values of dew points corresponding to humidity values stored in the device, the control unit being configured to monitor the change rate of the measured temperature, to determine, on the basis of the change rate, the moment at which the temperature reaches a temperature value of a dew point corresponding to the measured humidity on the basis of the dependence information, and to provide a prediction of fog appearance in relation to the moment employing the user interface, the portable personal device being a heart rate monitor.

16. A portable personal data processing device comprising:

a control unit for controlling the device;
a user interface coupled to the control unit for giving commands to the device and obtaining feedback on operation of the device;
a temperature sensor coupled to the control unit for measuring ambient temperature;
a humidity sensor coupled to the control unit for measuring ambient humidity; and
dependence information, which defines temperature values of dew points corresponding to humidity values stored in the device, the control unit being configured to monitor the change rate of the measured temperature, to determine, on the basis of the change rate, the moment at which the temperature reaches a temperature value of a dew point corresponding to the measured humidity on the basis of the dependence information, and to provide a prediction of fog appearance in relation to the moment employing the user interface, the portable personal device being a subscriber terminal of a radio system.

17. A portable personal data processing device comprising:

a control unit for controlling the device;
a user interface coupled to the control unit for giving commands to the device and obtaining feedback on operation of the device;
a temperature sensor coupled to the control unit for measuring ambient temperature;
a humidity sensor coupled to the control unit for measuring ambient humidity; and dependence information, which defines temperature values of dew points corresponding to humidity values stored in the device, the control unit being configured to monitor the change rate of the measured temperature, to determine, on the basis of the change rate, the moment at which the temperature reaches a temperature value of a dew point corresponding to the measured humidity on the basis of the dependence information, and to provide a prediction of fog appearance in relation to the moment employing the user interface, the portable personal device being a sports watch for use as an instrument in at least one of sports, hiking, sailing, mountain climbing and snow sports.

* * * * *